Patented Aug. 15, 1944

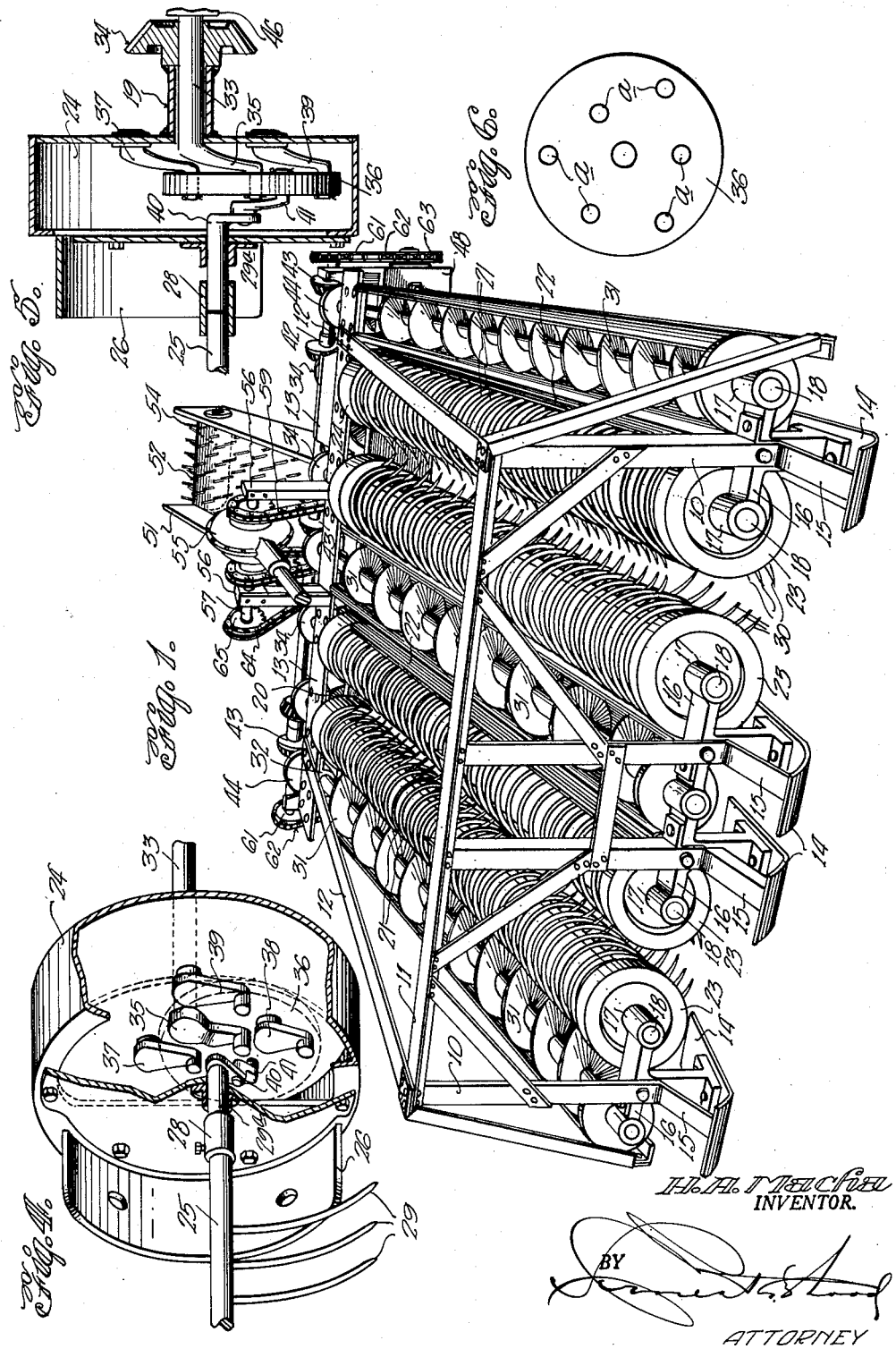

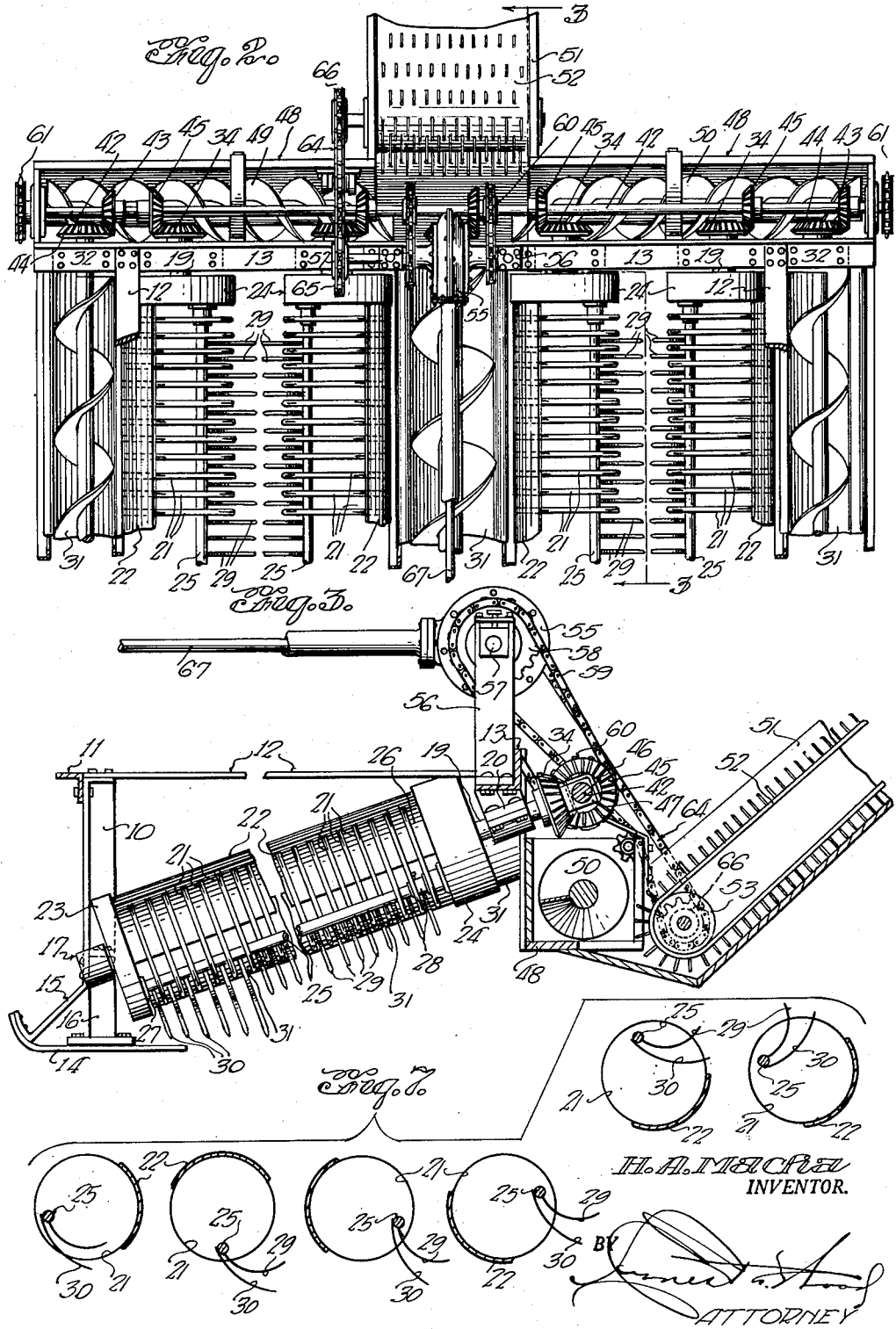

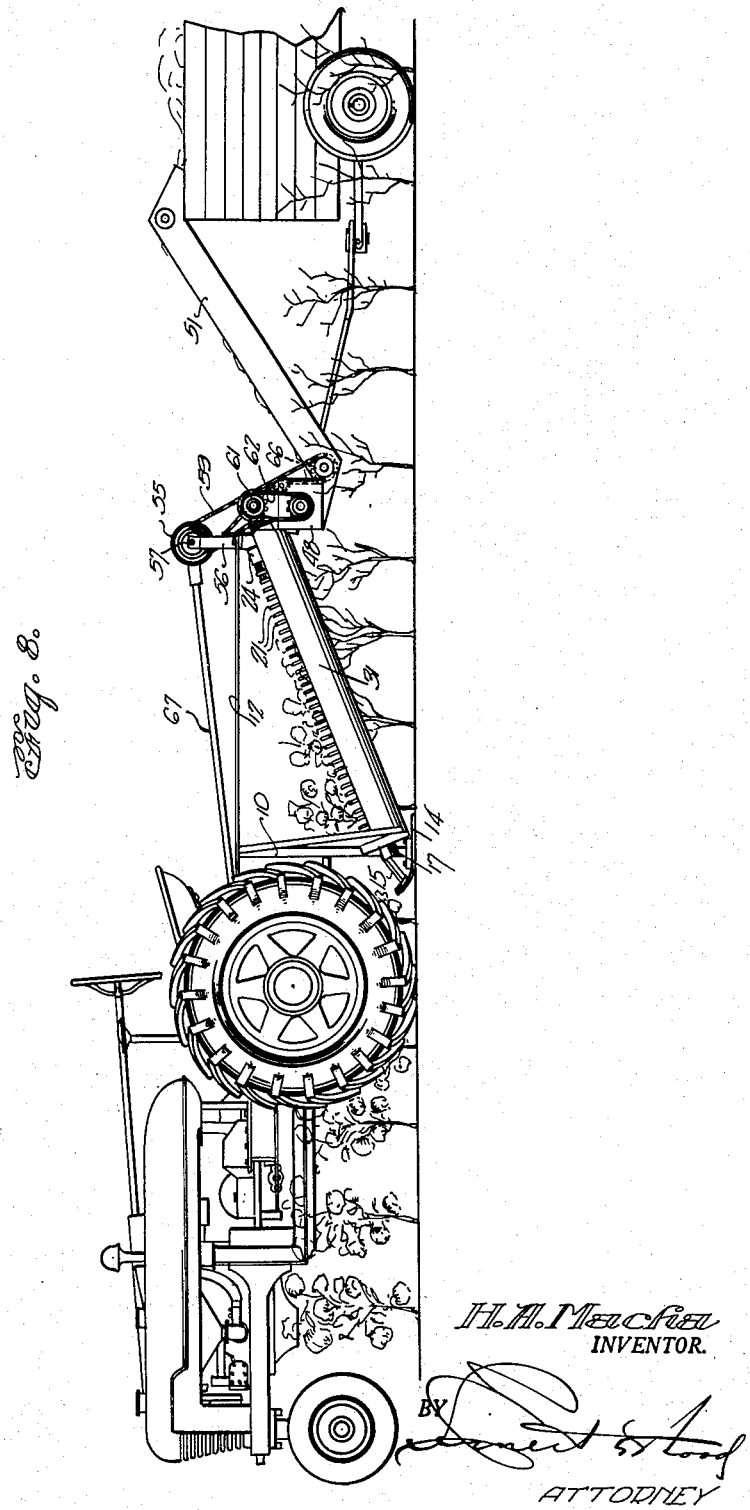

2,355,880

UNITED STATES PATENT OFFICE 2,355,880

COTTON HARVESTING MACHINE

Hynek A. Macha, Tahoka, Tex.

Application August 9, 1943, Serial No. 497,899

8 Claims. (Cl. 56—40)

This invention relates to cotton harvesting machines and more particularly to that type of machine designed to strip the cotton from the stalk in the field.

Climatic conditions have much to do with the various characteristics of cotton, that is, with respect to the stand, fruit, foliage, height of the stalk, and the like. Therefore, equipment for removing the seed cotton from the plant must be designed to meet the many different requirements as a result of these characteristic variations. For example, the plant of lowland cotton usually foliates abundantly and sometimes attains considerable height which requires a different harvesting method from that of plains cotton, the plants of which have scant foliage and are comparatively short above the ground.

It is therefore the principal object of the invention to provide a machine whose arrangement and design is such as to make it especially useful in gathering cotton of the variety last mentioned but will also very effectively harvest other types, by virtue of provisions therein for separating and discarding much of the trash, such as part of limbs, leaves, burs and the like clinging to the cotton as the latter is stripped from the stalk.

Another object of the invention is to provide a machine for stripping cotton from the stalk which consists principally of pairs of opposed and rotatable stalk stripping units, each comprising a cylindrical body made up of a multiplicity of relatively parallel rings, between which extend a like number of fingers, the latter being anchored to a shaft within and coaxial with the body and constrained to oscillate in such manner as to cause the fingers to emerge from and recede into the body during rotation of the latter, and at a brief, predetermined period in their cycle of operation, to move in a line perpendicular to the ground so that their engagement with the stalk will be in the same, substantially vertical plane.

Another object of the invention is to provide a stripping machine of the character specified wherein the rings of the stripping units serve to doff or divest the fingers of the cotton which has been stripped from the stalk, together with such other material as may be clinging thereto.

Still another object of the invention is to provide conveying means for receiving and transporting cotton and attendant material elevated by the fingers to a point of disposal.

Still another object of the invention is to provide a novel form of transmission designed to impart to the shaft carrying the picking fingers, a form of oscillation necessary to effect the described peculiar behavior of the fingers during rotation of the bodies of the stripping units.

Still another object of the invention is to provide baffles affixed to one side and coextensive with the bodes of the stripping units to prohibit entrance between the rings thereof of passing divested stalks during doffing periods of the fingers.

With the foregoing objects as paramount, the invention has particular reference to certain features of accomplishment, to become manifest as the description proceeds, taken in connection with the accompanying drawings, wherein:

Figure 1 is a perspective view of a stripping machine or harvester constructed according to the present invention.

Figure 2 is a fragmentary plan view.

Figure 3 is a side elevational view in vertical section taken on line 3—3 on Figure 2.

Figure 4 is a perspective view, partly broken away, showing the mechanism of the transmission for operating the stripper finger shaft.

Figure 5 is a view of the transmission in vertical section.

Figure 6 is a detail view of the crank adaptor plate of the transmission.

Figure 7 is a collective view, schematically illustrating several progressive positions of the stripper finger assembly in its cycle of operation, and Figure 8 is a side elevational view of the machine as it appears connected to a tractor.

In the course of the following detailed description of the drawings, it will be understood that particular emphasis is placed on the stripper units per se inasmuch as the attendant parts, such as the frame, conveyors, elevator and specific driving means are subject to variation, the nature of which may depend upon the type of draft equipment employed, the character of produce being harvested and other factors.

Accordingly, reference numeral 10 denotes a series of vertical uprights of angle iron at the forward end of the machine, connected together at their tops by a cross member 11. Two or more braces 12 extend from the cross member 11 to an angle iron beam 13 extending across the rear of the machine and which supports the rear bearings and driving mechanism to be described presently.

Mounted on the lower ends of the uprights 10 are shoes or skids 14, turned upwardly at their forward ends to facilitate their transportation over the soil and are suitably braced by virtue of the outwardly turned ends 15 of the uprights 10.

Mounted upon and rising above the skids 14 are substantially T-shaped castings 16, carrying bearings 17 in which the ends of stub shafts 18 are journaled, the latter providing the rotative axis of the stripping units which are also to be described presently. The opposite ends of the stripping units have hollow axles 19, to be described later and which operate in bearings 20, bolted to the underside of the angle iron beam 13.

Referring now specifically to the stripping units, it is to be observed that these units are arranged in pairs and disposed at an incline with respect to the ground. The drawings disclose two pairs of units for stripping two rows of cotton, the stalk passing between the units of each pair so that the stripping fingers will be caused to move through and divest the stalk of cotton and attendant material as the machine is advanced along the rows.

Each unit consists of a multiplicity of relatively parallel rings 21 of equal diameter and so spaced in relation to each other as to allow clearance for the stripping fingers to be identified later by reference numeral. Along one side of the cylindrical body thus formed by the rings is welded or otherwise secured a plate 22, curved transversely to conform to the curvature of the body and coextensive therewith. The width of this plate is equal to about one-third the circumference of the body but this ratio may be varied to suit conditions. The plate serves as the mounting for the rings 21 and also functions to baffle out the stalks as the machine progresses along the rows.

To the lower end of the plate is secured a circular head 23, in the center of which is affixed the stub shaft 18 while at the opposite end of the stripper body is secured the circular case or housing 24 (Figs. 4 and 5) which contains the mechanism for oscillating the shaft 25. The housing 24, is provided with a flange segment 26 curved to conform to the stripper body and it is to this flange that the upper end of plate 22 is bolted.

The shaft 25 extends through the body formed by the rings 21, and lies adjacent the inner surfaces thereof along one side of the body. The lower end of this shaft is journaled in a bearing 27 (Fig. 3) and its upper end is connected by a union 28 (Figs. 4 and 5), to a short driving shaft 29a extending from the housing 24 in offset relation to its center. At intervals throughout the length of the shaft 25 are mounted fingers 29, the relative spacing of which is determined by the spacing of the rings 21 of the body, between which they protrude at certain intervals during rotation of the body. The fingers are slightly curved as shown to insure retention of the material removed thereby from the stalks. Companion to the fingers 29 are similar fingers 30. These latter fingers are mounted near the lower end of the shaft 25 and the arc of their curve is slightly greater than that of fingers 29. Moreover, the fingers 30 next adjacent to the fingers 29 are longer and become progressively shorter towards the end of the shaft 25. This is for the purpose of stripping cotton from the stalks close to the ground, yet avoiding engagement with the ground.

It is apparent from the foregoing that with two of the picking units, one on each side of a row of stalks, and in confronting relationship, the fingers 29 and 30, in being moved through the stalks as the machine traverses the rows, will strip the stalks of burs containing cotton with a minimum content of leaves and other trash and as they are retracted inwardly as they are moved upwardly, as exemplified in Figure 7, the material withdrawn from the stalks will be elevated thereby until finally it is discharged onto the rings 21 at the top of the body at a point substantially diametrically opposite the position of the fingers at the beginning of the stripping operation, and at which point gravity acts to deliver the material into conveyors 31, situated along the discharge side of the stripper bodies.

The conveyors 31 on each side of the machine receive the material discharged by the fingers of the outside stripping units while the central conveyor, being somewhat larger, receives material stripped by the fingers of both of the inside units.

The lower ends of the conveyor shafts are journaled in bearings afforded by the castings 16 and the upper ends thereof operate in bearings 32, secured underneath the beam 13 at the rear of the machine.

Referring now to the mechanism for oscillating the stripper shaft 25, attention is directed to Figures 4 and 5 wherein is shown a shaft 33, entering the housing 25 at the rear thereof, through the hollow axle or sleeve 19, mentioned previously. It is important to note that the shaft 33 remains stationary while the sleeve 19 and housing 24 rotate, inasmuch as the sleeve 19 as exemplified in Figure 5 is welded both to the housing and to a beveled gear 34, which latter will be again mentioned in the course of the description of the drive to follow presently.

The inner end of the shaft 33 is formed into a crank 35, the pin of which is journaled in an adaptor plate 36, shown in dotted lines in Figure 4 for clarity. It is apparent therefore that when the housing 24 rotates, the body of the plate 36 will describe a circle therein but is constrained against rotation on its axis by the peculiar effects of the attendant cranks 37, 38 and 39, all of which are freely mounted in the rear wall of the housing 24.

The shaft 29a, to which is connected the upper end of the stripper shaft 25, has on its inner end a right angle extension 40, to which, in turn, is pivotally mounted a short crank 41. The pin of this crank, as are the pins of cranks 37, 38 and 39, pivotally joined to the adaptor plate 36 at radially different points to insure the results sought, i. e., irregular oscillation of the stripper shaft 25.

In describing the function of the cranks and their effect upon the shaft 25 and fingers 29 carried thereby, a better understanding can be had by referring to the illustrations in Figure 7.

As the housing 24 rotates in a counter-clockwise direction, viewing it from the front, the effect of the cranks 37, 38 and 39 will be to retard and rotate the adaptor plate 36 in a direction counter to that of the housing 24, to cause the fingers to dip slightly as the shaft 25 approaches and passes the bottom of the stripper body. The first three examples of this action in Figure 7 depict this performance and it is through this particular stage of operation that the fingers are moving upwardly through the stalks as the machine is transported along the rows. However, immediately upon assuming a position midway up the inside of the stripper body, the cranks 37, 38 and 39 reverse their positions and the adaptor plate 36 is caused to rotate in the same direction as the housing 24 and at an accelerated speed. This movement causes the fingers to move upwardly until they reach a position past the top of the stripper body, such as exemplified in the last illustration in Figure 7. At this point, the cranks are again effective to alter the direction of travel of the adaptor plate 36, causing it to move counter to the housing 24, which action, combined with the fact that the shaft 25 is now moving down the outside of the stripper body, causes the stripper fingers 29 to recede into the body and at an accelerated speed. This variation in speed of movement is effected by the spacing of the crank pin holes $a$ (Fig. 6) at a variety of positions with respect to the center of the plate. Figure 6 shows a greater number of holes than cranks in order that adjusted positions of the cranks can be effected to vary the movement of the plate.

It is further important to observe as especially shown in Figure 7, that the baffle plates 22, in being diametrically opposed to the operative areas of the fingers 29, they very effectively afford a smooth areaway for the passage of harvested stalks during periods when the fingers are being relieved of the material extracted from the stalks.

The driving mechanism for the several elements of the combination consists of a main drive shaft 42 which has mounted thereon at each end and at the middle, a bevel gear 43. These gears mesh with identical gears 44, one of which is mounted on the end of each of the relatively parallel conveyors 31 to drive the same. Similar gears 45 are likewise carried by the shaft 42 and mesh with gears 34 of the stripping units to operate the latter. The shaft 42 is supported by brackets 46, better shown in Figure 3, which embrace blocks 47 through which the said shaft 42 extends. The brackets, in turn, are mounted on the ends of the stationary shafts 33 of the stripper units, especially illustrated in Figure 5, although this figure shows but a fragmentary part of the bracket 46.

Below the shaft 42 and suspended from the cross beam 13 is a conveyor trough 48. Although this trough extends the full width of the machine at the rear, it has two separate conveyors 49 and 50 therein, one moving material to the right which is deposited thereinto by the conveyor 31 of the left hand stripping unit while conveyor 50 moves to the left the material discharged by the conveyor 31 of the right hand unit. The centrally disposed conveyor 31 deposits the material stripped by the two intermediate units into the trough 48 midway between its ends.

A chute 51 is disposed on an incline rearwardly of the machine with its receiving end in communication with the mid-portion of the trough 48 and with its discharge end at such elevation as to conveniently empty into a suitable trailer, not shown. An elevator belt 52 operates over rollers 53 and 54 in the chute 51 to transport material from the midportion of the trough 51 to the trailer or other vehicle.

In order to drive the main shaft 42, a gear housing 55 is mounted upon standards 56, the latter, in turn, being supported upon the cross beam 13. This gear housing may be in the nature of an automobile differential as best suited for the purpose. The axle shafts 57 are journaled in bearings supported by the standards 56 and these have sprockets 58 mounted thereon, over which chains 59 pass to drive sprockets 60, mounted on the shaft 42.

In order to drive the end conveyors 49 and 50, sprockets 61 are mounted on the ends of shaft 42, exteriorly of the trough 48 and chains 62 surround these sprockets and similar sprockets 63, mounted on the ends of the shafts of conveyors 49 and 50.

The elevator belt 52 is driven by means of a chain 64, surrounding sprocket 65, mounted on one of the axle shafts 57 of the differential 55 and a sprocket 66, mounted on the shaft carrying the roller 53 of the lower end of the conveyor belt 52.

The differential gears are driven by means of the propeller shaft 67, extending toward the forward end of the machine, shown broken off in Figures 1, 2 and 3, but is connected to the power take-off shaft of a tractor, in a manner suggested in Figure 8.

Inasmuch as the operation of the machine has been quite fully discussed in the foregoing description of its construction, it is believed that the function of the machine is sufficiently obvious as to render a separate description of operation unnecessary.

Manifestly, the construction as shown and described is capable of some modification and such modification as may be construed to fall within the scope and meaning of the appended claims is also considered to be within the spirit and intent of the invention.

What is claimed is:

1. A cotton harvesting machine including inclined pairs of opposed, coordinating harvesting units arranged for transportation along rows of cotton, each unit comprising a multiplicity of relatively parallel, equidistantly spaced rings forming a rotatable cylindrical body, an oscillatable shaft mounted within and coextensive with said body and offset with respect to the center thereof, a multiplicity of arcuate fingers mounted in spaced relation on said shaft and adapted, at predetermined intervals to be projected and retracted between the rings of said body, to engage and divest cotton stalks of material, means for collecting and conveying material extracted by said fingers, means coextensive with the exterior of said body and embracing a portion of its circumference and adapted, during inoperative periods of said fingers, to deflect harvested stalks away from said body a rotatable housing to which one end of said body is affixed, an adapter plate mounted in said housing, means for constraining said plate to travel in a circular path about the axis of said body, and a crank connecting said finger bearing shaft to said plate in offset relation to its center for oscillating said finger bearing shaft, simultaneously with the rotation of said housing and body.

2. A cotton harvesting machine including inclined pairs of relatively opposed and coordinating harvesting units adapted for transportation along rows of cotton, each unit comprising a cylindrical, circumferentially slotted body mounted for rotation on its longitudinal axis and having means for slidably supporting its lower end on the ground, a housing affixed to one end of said body, an oscillatable shaft extending through said body adjacent one side thereof, curved fingers spaced on said shaft the length thereof and adapted, at predetermined intervals to be extended and retracted through the slots of said body to respectively harvest said cotton and discharge the same, means for receiving and conveying cotton discharged by said fingers, a plate suspended by cranks journaled in the rear wall of said housing and constrained thereby to travel in an irregular path about the longitudinal axis of said body, means connecting said plate and said shaft for oscillating said shaft to cause said fingers to describe an irregular path in the course of movement, means for rotating said body simultaneously with the movement of said fingers and means carried by said body to deflect harvested stalks during inoperative periods of said fingers.

3. In a cotton gathering machine a series of pairs of inclined gathering units, each of said units comprising an elongated, cylindrical and circumferentially slotted body, a housing at one end of said body, an oscillatable shaft within and extending the length of said body, curved fingers spaced on said shaft and adapted, when the latter is oscillated, to extend and recede through the slots of said body to respectively strip cotton bearing stalks and discharge the extracted cotton, conveyor means receiving the discharge of said fingers, means for deflecting stripped stalks during discharge periods of said fingers, means for rotating said body, a crank actuated member disposed in said housing and constrained by said cranks to travel an irregular course about the axis of said body, and means connecting said shaft to said member in offset relation to its geometrical center for oscillating said shaft simultaneously with the rotation of said body.

4. In a cotton stalk stripping machine, a series of pairs of stripping units, each of said units comprising an elongated slotted body supported at its lower end on the ground and capable of rotation, a housing at the upper end of said body, a multiplicity of curved fingers mounted for movement in and out of the slots of said body to successively pass upwardly through and strip stalks of cotton of material and to be subsequently divested of said material upon recession into said body, conveyors for collecting and transporting material divested from said fingers, a plate mounted in said housing on cranks and constrained thereby to travel an irregular course about the axis of said body, crank means connecting said finger mounting to said plate in offset relation to its center for transmitting the motion of said plate to the mounting of said fingers and means for simultaneously rotating said body.

5. A machine for stripping cotton from growing stalks comprising pairs of inclined stripping units, each of said units comprising a rotatable and circumferentially slotted body, curved stripping fingers mounted on a shaft within said body to effect periodical extension and retraction of said fingers through the slots of said body to progressively pass through the strip stalks of cotton, means for relieving said fingers of the stripping of said stalks, means for receiving and transporting said strippings, a plate suspended by cranks at one end of said body and constrained thereby to travel an irregular course about the axis of said body, means connecting said plate and said shaft in offset relationship to cause said shaft to simulate the movement of said plate and means for simultaneously rotating said body.

6. The organization set forth in claim 5 in which the slotted body is composed of relatively parallel rings of equal diameter affixed to a plate extending the length of said body and whose width is a fraction of the circumference of said body.

7. The organization set forth in claim 5 in which the mounting for the fingers extends the length of the body in offset relation to its rotating axis and arranged to oscillate to constrain the extremities of said fingers to describe an irregular path, defining in their operative cycle a plane perpendicular to the ground.

8. A structure as set forth in claim 5 in which the means for actuating the fingers consists of a series of cranks, one of which is stationary, and a crank adaptor plate actuated and constrained by said cranks to move in an irregular path and means for transmitting the prescribed motion of said plate to the mounting of said fingers, which combined with the rotation of the body, will cause said fingers to move toward, through and away from the cotton stalks in their cycle of operation.

HYNEK A. MACHA.